(No Model.) 5 Sheets—Sheet 1.

S. V. KENNEDY & D. STRUNK.
MOWING MACHINE.

No. 383,644. Patented May 29, 1888.

Witnesses,
R. H. Sanford.
Richard Paul.

Inventors,
Samuel V. Kennedy
and Daniel Strunk
By A. C. Paul, atty

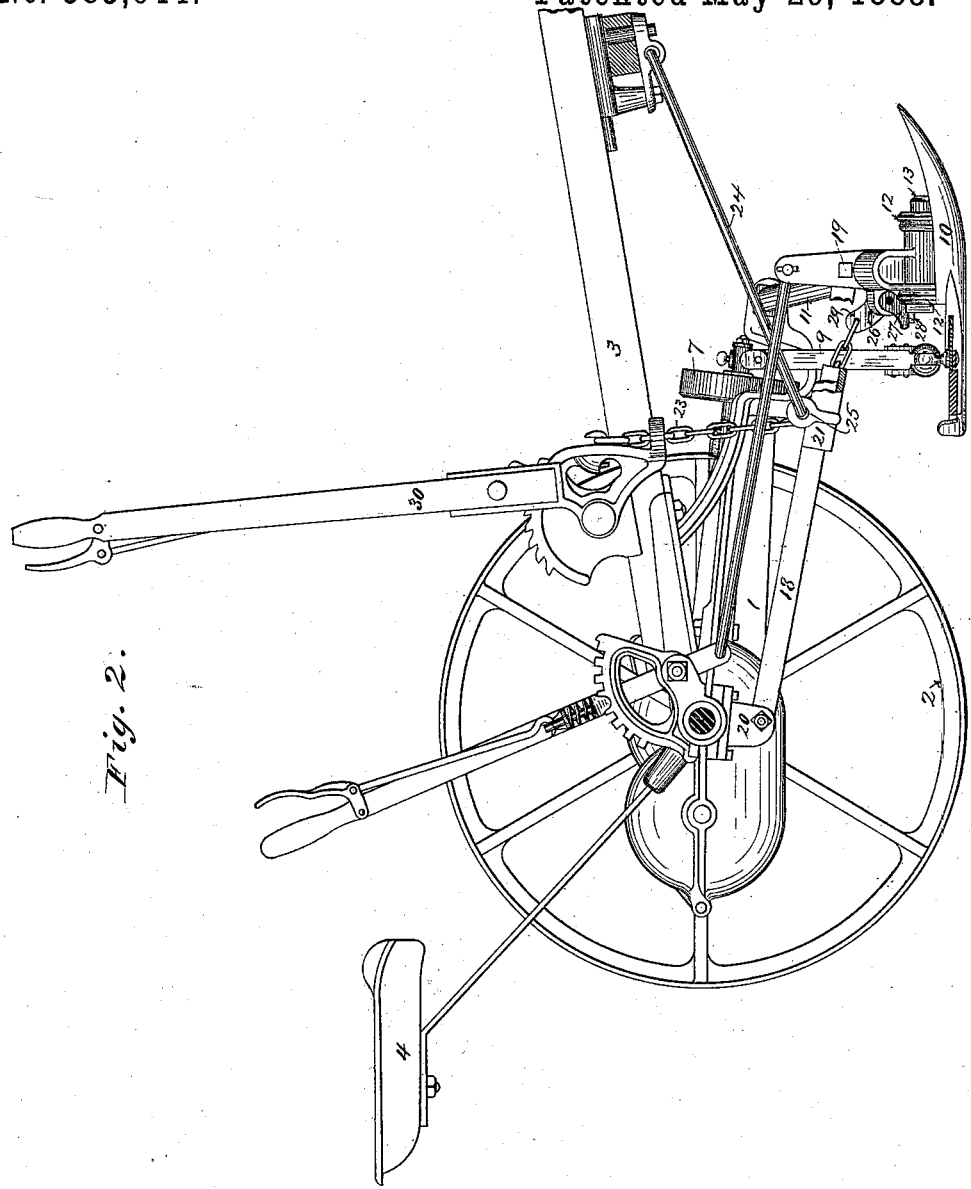

(No Model.) 5 Sheets—Sheet 3.
S. V. KENNEDY & D. STRUNK.
MOWING MACHINE.
No. 383,644. Patented May 29, 1888.
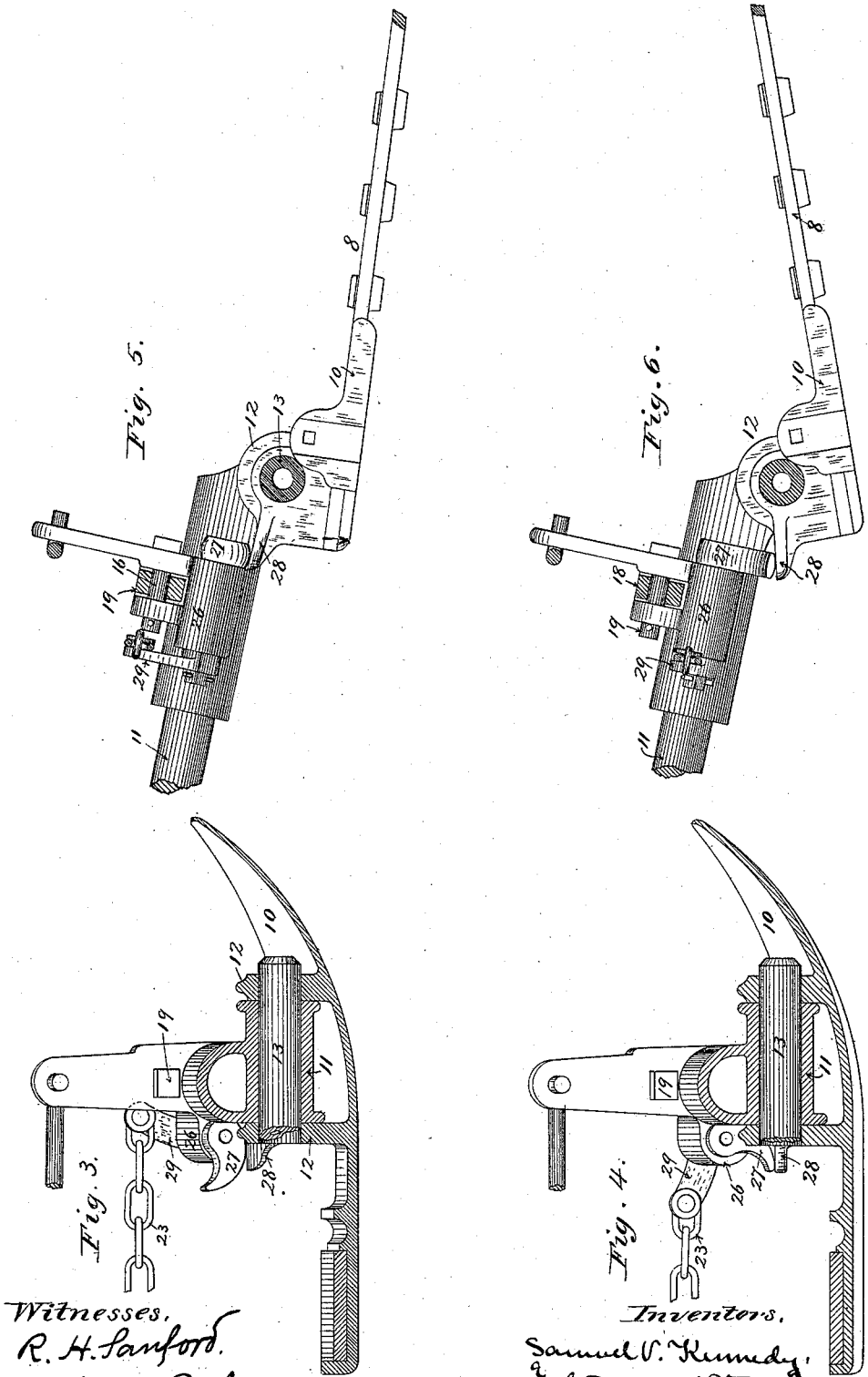

(No Model.) 5 Sheets—Sheet 4.

S. V. KENNEDY & D. STRUNK.
MOWING MACHINE.

No. 383,644. Patented May 29, 1888.

Witnesses.
R. H. Sanford.
Richard Paul.

Inventors.
Samuel V. Kennedy
and Daniel Strunk,
By A. C. Paul
att.

(No Model.) 5 Sheets—Sheet 5.

S. V. KENNEDY & D. STRUNK.
MOWING MACHINE.

No. 383,644. Patented May 29, 1888.

Witnesses.
R. H. Sanford,
J. Jessen.

Inventor
Samuel V. Kennedy.
and
Daniel Strunk.
By A. C. Paul, atty.

UNITED STATES PATENT OFFICE.

SAMUEL V. KENNEDY AND DANIEL STRUNK, OF MINNEAPOLIS, MINNESOTA, ASSIGNORS TO THE MINNEAPOLIS HARVESTER WORKS, OF SAME PLACE.

MOWING-MACHINE.

SPECIFICATION forming part of Letters Patent No. 383,644, dated May 29, 1888.

Application filed April 2, 1886. Serial No. 197,495. (No model.)

*To all whom it may concern:*

Be it known that we, SAMUEL V. KENNEDY and DANIEL STRUNK, of Minneapolis, in the county of Hennepin and State of Minnesota, have invented certain Improvements in Mowing-Machines, of which the following is a specification.

Our invention relates to improvements in mowing-machines; and the object we have in view is to provide an improved means for throwing and locking the cutting apparatus into and out of action.

The invention consists, generally, in the construction and combination hereinafter described, and particularly pointed out in the claims.

Figure 1:
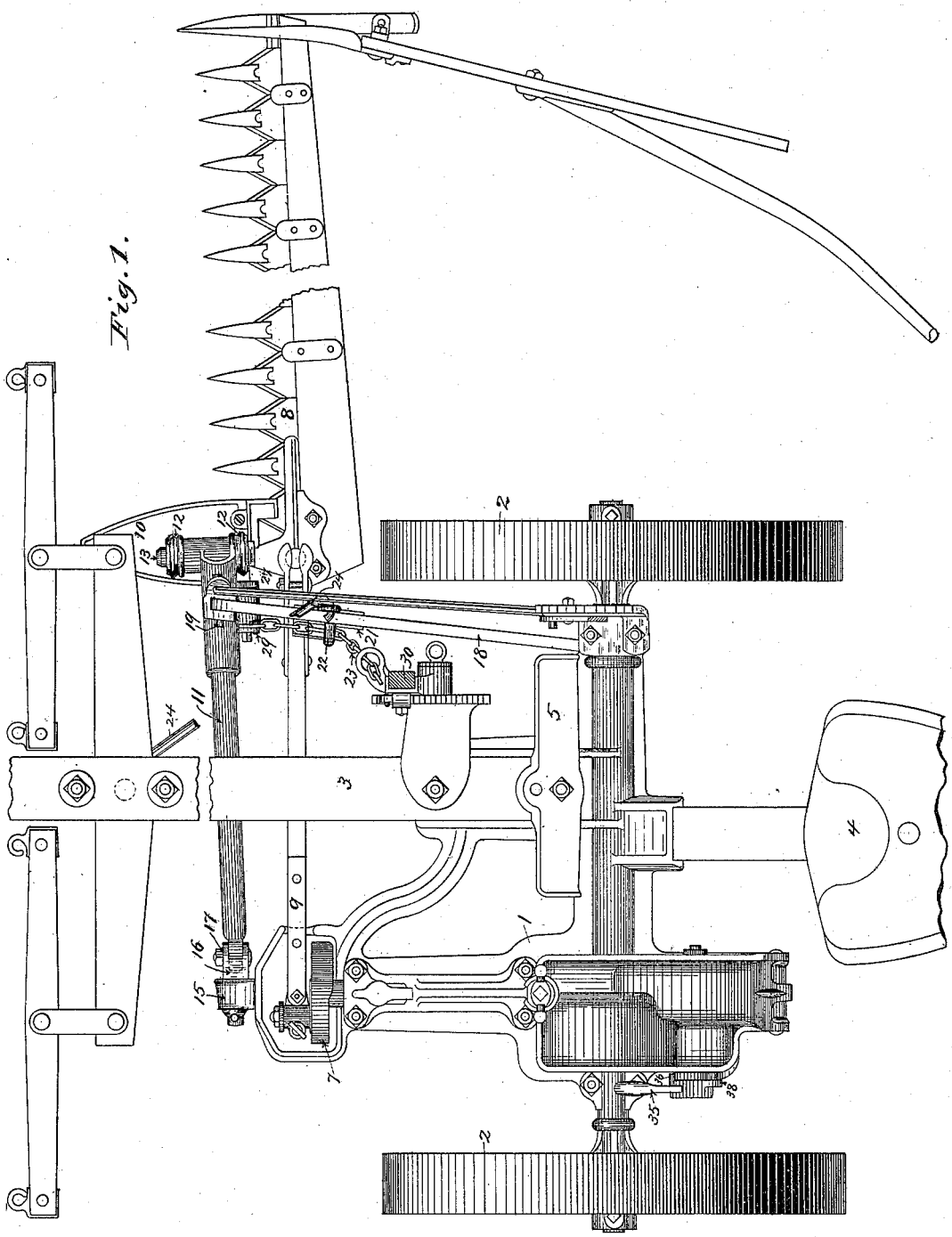
Figure 7:
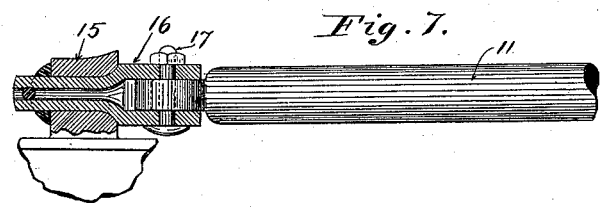
Figure 8:
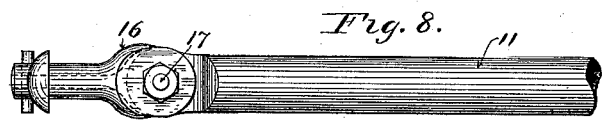
Figure 9:
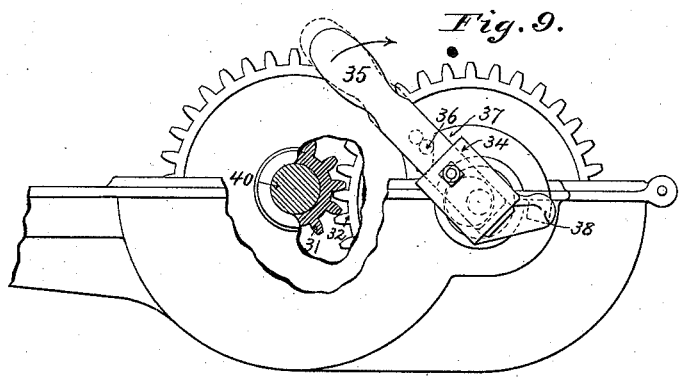
Figure 10:
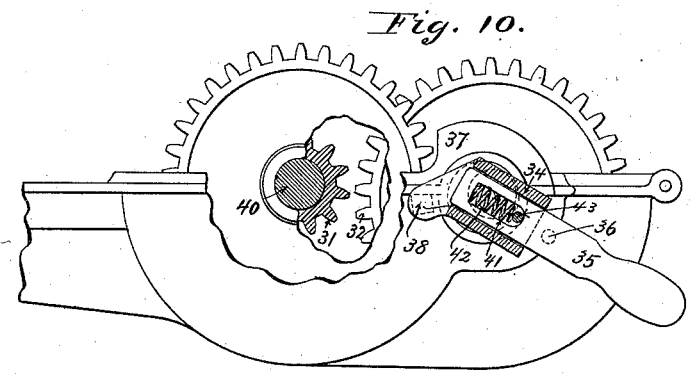
Figure 15:
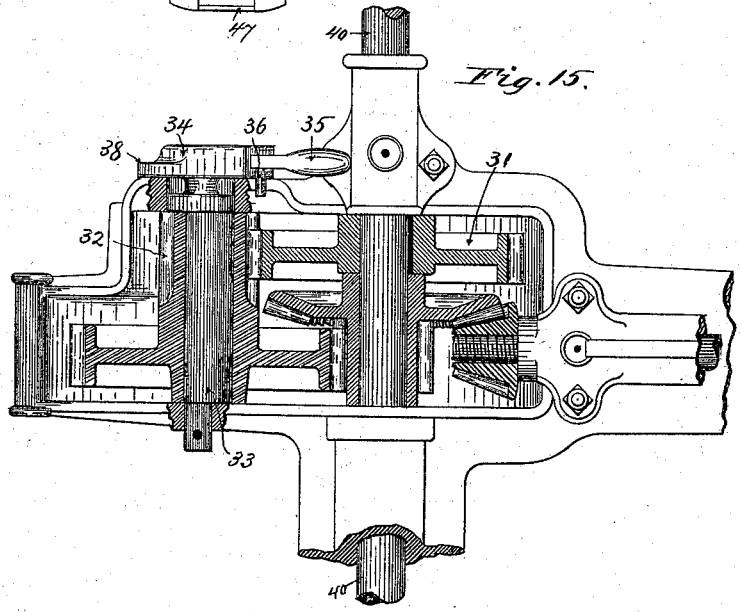

In the drawings forming part of this specification, Figure 1 is a plan view of a mowing-machine embodying our invention. Fig. 2 is a grain-side elevation of the same. Fig. 3 is a section of a portion of the cutting apparatus, showing our improved "gag" or securing device. Fig. 4 is the same with the gag or securing device in a different position. Figs. 5 and 6 are details showing the cutter-bar at different angles. Fig. 7 is a partial section showing the connection between the cutting apparatus and the main frame. Fig. 8 is a side elevation of the same. Figs. 9 and 10 are detached views showing the means for throwing and locking the cutting apparatus into and out of action. Figs. 11, 12, 13, and 14 are details of the swivel-block. Fig. 15 is a partial section showing the shipping mechanism.

1 is the main frame of a mowing-machine, mounted upon wheels 2 in the ordinary way, and provided with the pole 3, seat 4, and foot-rest 5, in the usual manner.

7 represents the crank, which operates the cutter or sickle 8 through the pitman 9.

Figure 11:
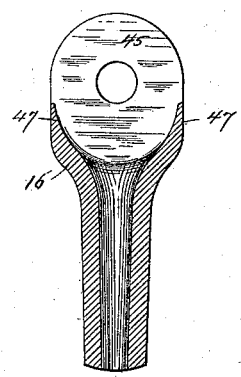
Figure 12:
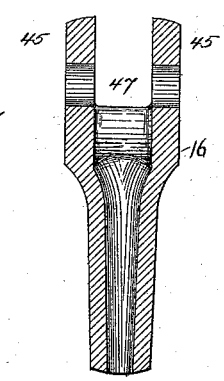
Figure 13:
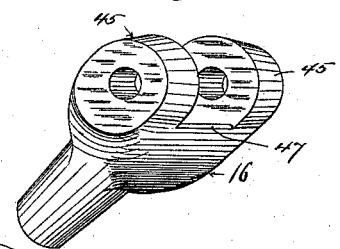
Figure 14:
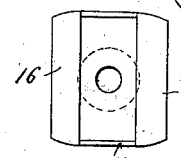

10 is the main shoe, to which the cutting apparatus is fastened. This shoe is provided with ears or lugs 12, which receive one end of the coupling-bar 11, which is hinged thereto by means of the joint-pin 13. The opposite end of the connecting-bar 11 is pivoted to a swivel-block, 16, by the pin 17. This swivel-block is cast hollow, as shown in Figs. 7, 11, and 12, to give an even thickness throughout, and its end or spindle is made to conform to a bell-shaped opening, through which it passes in the lug 15 on the main frame, and is held in place by means of the washer and pin. By making this swivel-block in the manner shown we avoid all sharp angles or shoulders and form a swivel-block or connecting-iron that rocks or turns freely on its axis as the cutting apparatus is raised. We add to the strength of this swivel-block by connecting the two ears 45, forming the sides of the forked portion, by a web or shrouding, 47, which extends above and below the eye on the coupling-bar 11.

18 represents a push or thrust bar, hinged at one end to the coupling-bar 11 by the pin 19 and attached at its opposite end to the lug 20 upon the frame of the machine.

21 is a clamp-iron fastened to the thrust-bar 18, provided with a hole or eye, 22, through which the raising-chain 23 passes. To the outside of this iron the draft-rod 24 is preferably fastened by means of the eye 25. The raising-chain 23 turns a corner as it passes through the eye or loop 22 on the push-bar. When the cutting apparatus is resting on the ground, with no weight on the raising-chain, the latter renders very readily through the eye; but in raising the cutting apparatus after the gag-iron has come in contact with the heel of the shoe the chain is strained by the weight of the said apparatus, which adds so much resistance to the chain running around the corner where it passes through the eye that it becomes stationary in relation thereto, and the hand-lever will not overcome the said resistance to actuate the gag-iron, and thereby throw up the outer end of the cutter-bar by depressing the inner end thereof, nor can the weight of the cutter-bar overcome the resistance and actuate the gag-iron in the opposite direction, and thereby hang down at the outer end.

26 is a bearing on the coupling-bar 11, in which the shaft of the gag-lever 27 is journaled. This lever is cam-shaped and adapted to bear upon the heel 28 of the main shoe 10, and is operated by means of a short arm or rock-shaft lever, 29, upon the end of the shaft on the opposite side of the journal-bearing. One end of the raising-chain 23 is attached to this lever, from which the said chain passes through the eye 22, and is attached at its opposite end to the lever 30, which is pivoted to a quadrant upon the pole or the main frame of the machine. When the machine is in operation, the lever 30 is thrown forward, the raising-chain is slack, and the cutting apparatus is free to conform to any unevenness of the ground by rocking upon the pin 13, which attaches it to the shoe. The cutter-bar may be horizontal or at an angle above or below, as shown in Figs. 5 and 6. The gag-lever, being free in its bearing, offers no resistance to the heel of the main shoe, which may vibrate up or down as the cutter-bar changes its angle in passing uneven places. When, however, in order to pass an obstacle, or for any cause, it becomes necessary to raise the entire cutting apparatus from the ground, the lever 30 is forced backward by the operator, which, through the chain 23, operates the lever 29 and partially revolves the gag-lever 27 in its bearing and causes it to come in contact with the heel 28 on the shoe 10, in whatever position this may be at the time. This contact limits the movement of the gag-lever, and the cutter-bar and shoe 10 and the coupling-bar 11 are secured together at whatever relative position they may be at the time of such contact, and the whole raised from the ground in this position as readily as would be the case if the gag-lever were omitted and the chain coupled direct, as in the ordinary way. The gag-lever 27 also forms a rigid stop, against which the heel 28 bears to prevent the bar from rocking on the joint as it is raised, and causing both ends to be elevated at the same time, at whatever angle the cutter-bar may be.

With our construction and arrangement the gag-iron may be operated at any time, at whatever angle the cutter-bar may be, to lock the cutter-bar and cause its outer end to be raised from the ground concurrently with its inner end without changing the relative position of the other parts of the machine.

31 is a pinion upon the driving-shaft 40, which meshes with the gear 32, which drives the sickle. The gear 32 revolves loosely upon an eccentric-shaft, 33, which is journaled in the main frame at each side of the gear in the ordinary way.

The eccentric shaft 33 carries upon one end a rectangular keeper, 34, within which the handle 35 slides freely. The said handle is provided with a slot, 41, in which the coil-spring 42 is secured. One end of this spring bears upon the handle 35 and the other upon a pin, 43, which is fastened to the keeper, as shown in Fig. 10. The handle 35 is also provided with a pin or projection, 36, adapted to engage a semicircular projection, 37, upon the main frame and to form a lock to hold the pinion and gear 31 and 32 in mesh, as shown in Fig. 9.

38 is a projection upon the back of the keeper 34, which comes in contact with a flange upon the frame and limits the movement of the sleeve upon its axis in either direction.

When it is desired to throw the machine out of gear, the handle 35 is drawn out against the action of the spring 42 until the pin or projection 36 on the said handle clears the projection 37 on the frame, as shown in dotted lines in Fig. 9. The handle 35, the keeper 34, and eccentric-shaft 33, attached thereto, are now free to revolve for a certain part of a revolution in the direction of the arrow, Fig. 9, or until the projection 38 comes in contact with the frame upon the opposite side of the shaft 33. This partial revolution of the eccentric-shaft moves the gear 32 away from the pinion and throws them out of mesh, as shown in Fig. 10. A reverse motion of the handle 35 and eccentric-shaft 33 carries the gear and pinion together. The pin or projection 36 travels over the semicircular projection 37 until it drops in front of it by the reaction of the spring 42. At the same time the projection 38 on the keeper comes in contact with the frame, and the machine is again locked into gear, as shown in Fig. 9.

We claim as our invention—

1. In a mowing-machine, the combination, with a main shaft having a gear-wheel mounted thereon, of an eccentrically-mounted shaft carrying a gear-wheel adapted to engage with the gear-wheel on the main shaft, a keeper on one end of the eccentric-shaft, a handle sliding freely therein, a projection on the main frame, and a projection on the sliding handle adapted to engage therewith, substantially as described.

2. In a mowing-machine, the combination, with a main shaft having a gear-wheel mounted thereon, of an eccentrically-mounted shaft carrying a gear-wheel adapted to engage with the gear-wheel on the main shaft, a keeper on one end of the eccentric-shaft, a handle sliding in said keeper, a projection or pin, 36, on the sliding handle, a projection, 37, on the main frame, and a spring engaging said handle and adapted to snap the projection 36 thereon in front of the projection on the main frame to lock the machine into gear.

In testimony whereof we have hereunto set our hands this 22d day of March, 1886.

SAMUEL V. KENNEDY.
  DANIEL STRUNK.

In presence of—
 GEORGE A. HANSON,
 A. C. PAUL.